United States Patent
De Keizer

(10) Patent No.: US 10,281,269 B2
(45) Date of Patent: May 7, 2019

(54) METHOD AND DEVICE FOR DETERMINING A HEIGHT OF A SETTLED BED IN A MIXTURE IN A LOADING SPACE

(71) Applicant: IHC Systems B.V., Sliedrecht (NL)

(72) Inventor: Cornelis De Keizer, Dordrecht (NL)

(73) Assignee: IHC Holland IE B.V., Sliedrecht (NL)

(*) Notice: Subject to any disclaimer, the term of this patent is extended or adjusted under 35 U.S.C. 154(b) by 772 days.

(21) Appl. No.: 14/415,286

(22) PCT Filed: Jul. 17, 2013

(86) PCT No.: PCT/NL2013/050541
§ 371 (c)(1),
(2) Date: Jan. 16, 2015

(87) PCT Pub. No.: WO2014/014350
PCT Pub. Date: Jan. 23, 2014

(65) Prior Publication Data
US 2015/0198441 A1 Jul. 16, 2015

(30) Foreign Application Priority Data
Jul. 17, 2012 (NL) ..................................... 2009199

(51) Int. Cl.
*G01B 21/08* (2006.01)
*G01F 23/296* (2006.01)
(Continued)

(52) U.S. Cl.
CPC ........... *G01B 21/08* (2013.01); *G01F 23/296* (2013.01); *G01F 23/2966* (2013.01); *E02F 3/907* (2013.01); *E02F 7/04* (2013.01)

(58) Field of Classification Search
CPC ........ E02F 3/907; E02F 7/04; G01F 23/2966; G01F 23/296; G01B 21/08
(Continued)

(56) References Cited

U.S. PATENT DOCUMENTS 3,133,442 A 5/1964 Werner
3,208,281 A 9/1965 Kalmus et al.
(Continued)

FOREIGN PATENT DOCUMENTS

CN 2222344 Y 3/1996
DE 10 42 251 B 10/1958
(Continued)

OTHER PUBLICATIONS

Jung, Sung Soo et al., "Level Gauge by Using the Acoustic Resonance Frequency", Nov. 2003, Journal of the Korean Physical Society, vol. 43, No. 5, pp. 727-731.*
(Continued)

*Primary Examiner* — Mischita L Henson
(74) *Attorney, Agent, or Firm* — N.V. Nederlandsch Octrooibureau; Catherine A. Shultz; Tamara C. Stegmann

(57) ABSTRACT

A method for determining a height ($h_s$) of a settled bed in a mixture in a loading space (1). The mixture consists of a settled bed (5) and a mixture soup (3) which is located above the settled bed (5). The method includes:
a) providing an elongated resonance member (10) in the loading space (1) which extends in a substantial vertical direction,
b) measuring a resonance frequency ($f_o$) of the resonance member (10),
c) computing a height ($h_s$) of the settled bed (5),
Action b) includes determining an indication of or imposing the tensile force ($F_s$) acting in the longitudinal direction of the resonance member (10) and c) includes computing a height ($h_s$) of the settled bed (5) based on the measured resonance frequency ($f_o$) and the determined indication of the tensile force or the imposed tensile force.

17 Claims, 4 Drawing Sheets

(51) Int. Cl.
 *E02F 3/90* (2006.01)
 *E02F 7/04* (2006.01)

(58) Field of Classification Search
 IPC .................... E02F 3/907,7/04; G01F 23/2966,
 G01F 23/296;
 G01B 21/08
 See application file for complete search history.

(56) References Cited

U.S. PATENT DOCUMENTS

| | | |
|---|---|---|
| 3,690,180 A | 9/1972 | Van Der Veer |
| 3,698,573 A | 10/1972 | Wolter et al. |
| 3,796,088 A | 3/1974 | Gustafsson et al. |
| 3,807,231 A | 4/1974 | Spaw |
| 4,179,311 A | 10/1979 | Spaw |
| 4,365,509 A | 12/1982 | Cornelis |
| 5,054,318 A | 10/1991 | Lew |
| 5,074,148 A | 12/1991 | Lew |
| 6,324,910 B1 * | 12/2001 | Funk .................. G01C 19/5726 73/514.16 |
| 7,574,898 B2 | 8/2009 | Harrison et al. |
| 2012/0121059 A1 | 5/2012 | Kim |

FOREIGN PATENT DOCUMENTS

| | | |
|---|---|---|
| DE | 10 2005 018397 A1 | 11/2006 |
| EP | 0 456629 A1 | 11/1991 |
| EP | 1 783 466 B1 | 5/2007 |
| EP | 2261612 A1 | 12/2010 |
| GB | 475274 A | 6/1937 |
| WO | 2006/084263 A2 | 8/2006 |
| WO | 2011007972 A2 | 1/2011 |

OTHER PUBLICATIONS

Bardyshev, V.I. et al., "A Resonant Acoustic Level Gauge", 2000, Acoustical Physics, vol. 46, No. 3, pp. 269-273.*
International Search Report, dated Oct. 1, 2013, from corresponding PCT application.

* cited by examiner

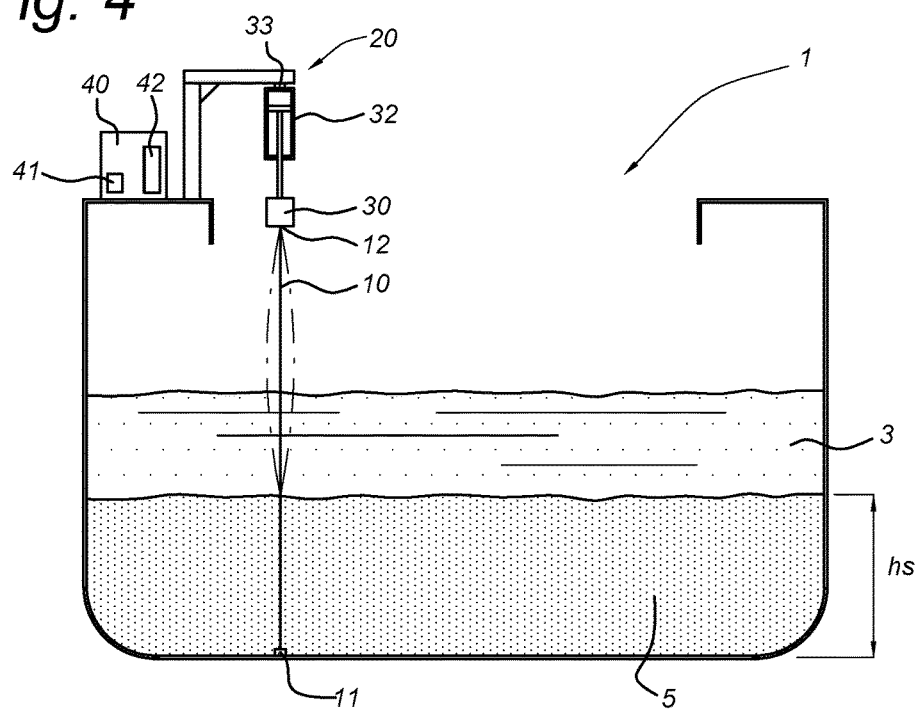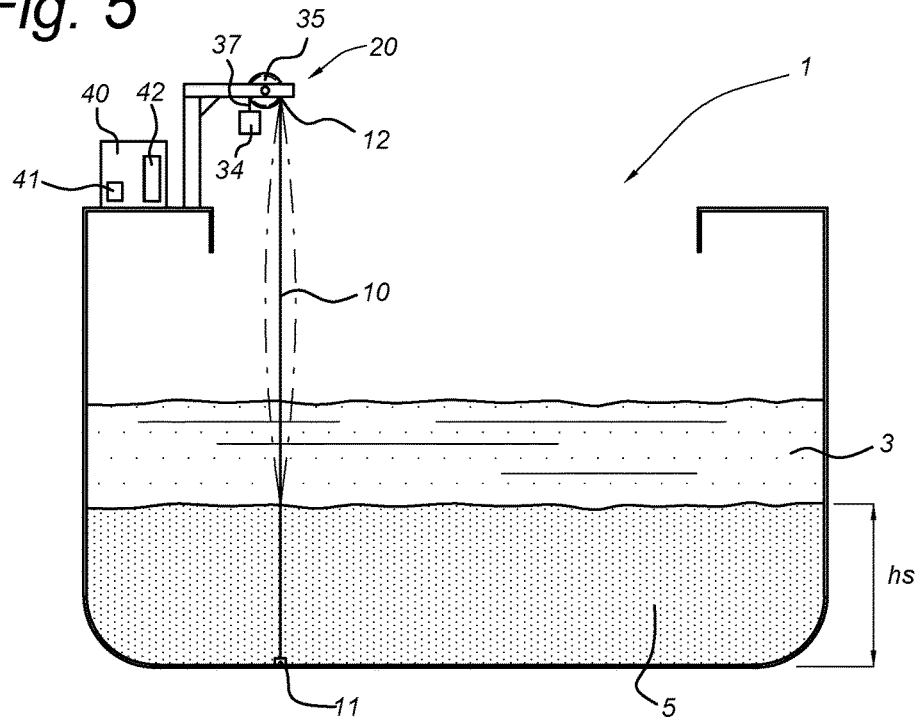

US 10,281,269 B2

METHOD AND DEVICE FOR DETERMINING A HEIGHT OF A SETTLED BED IN A MIXTURE IN A LOADING SPACE

FIELD OF THE INVENTION

The present invention relates to a method for determining a height of a settled bed in a mixture in a loading space, wherein the mixture consists of a settled bed and a mixture soup which is located above the settled bed, and wherein the method comprises:
a) providing an elongated resonance member in the loading space which extends in a substantial vertical direction,
b) measuring a resonance frequency of the resonance member,
c) computing a height of the settled bed based on the measured resonance frequency.

The invention further relates to a device for determining a height of a settled bed in a mixture in a loading space of a vessel, a vessel comprising such a loading space and a device, a control unit, a computer program and a data medium, comprising such a computer program.

PRIOR ART

The determination of the settled quantity of substrate in the loading space of a machine, for example in the bin (open area or hopper) of a vessel, such as a dredger, e.g. a trailing suction hopper dredger, is very important for ensuring that the dredging is as efficient as possible.

Trailing suction hopper dredgers of this type are used to maintain the depth of or deepen shipping channels, to dredge new shipping channels, and for sand and gravel extraction, for example for infrastructure projects and land reclamation.

Depending on the type of work, widely differing materials are dredged: sludge, clay, fine sand, coarse sand, gravel, rock and often a combination thereof. The suction process must match the type of substrate. The speed with which the loading space is filled preferable matches the settling speed of the dredged mixture. If the loading space is filled too quickly, a part of the material will not be given enough time to settle and will leave the ship once more via an overflow. Filling which is too slow is not attractive from a cost perspective. It is therefore very important to know how quickly the dredged-up mixture of water and substrate settles in the loading space. This will be explained in detail with reference to FIG. 1. FIG. 1 shows a cross section of a loading space of a vessel.

The dredging cycle starts with an empty loading space 1, which is loaded in a determined time (typically around 1 to 2 hours). In that time, the level of the mixture rises in the loading space 1 and a part of the mixture simultaneously settles. The settled part is referred to as the sand bed or settled bed 5 (settled sand) and has density $\rho_s$. The unsettled mixture above it is referred to as the mixture soup 3.

If the maximum loading space level is reached, the top layer 2 of the mixture soup 3 is fed outwards via a so-called overflow and loading can continue for a further period (this situation is not shown in FIG. 1).

The reason for this is that the density $\rho_m$ of the mixture soup 3 which leaves the loading space 1 via the overflow is then still lower than the density which is loaded. The height of the settled bed 5 rises and therefore also the density $\rho_m$ of the mixture soup 3 above the settled bed 5. This process continues until the density $\rho_m$ of the mixture soup 3 which flows away through the overflow is so high that it is no longer efficient to continue loading.

To allow the loading process to run as efficiently as possible, it is necessary to know the settling speed: sludge does not settle, fine sand settles very slowly, coarse sand more quickly, whereas gravel and rock drop immediately. Depending on this settling speed and the associated speed at which the height $h_s$ of the settled bed 5 rises, the dredging process can be controlled differently in terms of loading speed and density of the dredged mixture, so that the settling process will run more efficiently.

It is therefore advantageous to know the height $h_s$ of the settled bed 5 during the loading. Techniques for determining this height are known from the prior art.

In the patent document with publication number EP 0 456629, various measuring principles are described, wherein the density is measured as a function of the height of the loading space via radioactive means. This method is complex, expensive and difficult to carry out due to the radiation hazard, and its use is therefore also very restricted.

In the patent document with publication number EP1 783 466, the height $h_s$ of the settled bed is only measured afterwards, after waiting until all of the substrate has settled once the loading process has stopped. This method assumes that the mixture above the settled bed consists of water. This method is therefore not suitable for use during the loading process, so that the loading process cannot be influenced during loading.

It is furthermore known from the prior art for a mixture height $h_h$ of the mixture in the loading space to be determined, for example, via ultrasound or radar distance measurements from above. The height of the dredging mixture $h_h$ is thus known and the volume $V_h$ can be calculated, taking into account the trim and heel of the vessel and the shape of the loading space 1.

The weight of the dredging mixture in the loading space 1 is also measured. This can be done with the aid of a suitable weighing installation. This can be done by measuring the change in depth of the vessel: the mass of the additional displaced quantity of water $\Delta V_w$ is equal to the weight m in the loading space: $m=\Delta V_w \cdot \rho_w$, where $\rho_w$ is the density of the water in which the vessel travels.

The average density in the loading space can be calculated from these data: $\rho_h=m/V_h$. However, the height of the settled bed in the mixture is not thus known and it is therefore also not possible to determine the speed of increase in the height of the settled bed.

From the prior art, different solutions for determining the height of the settled bed are known, such as from EP2261612A1, U.S. Pat. Nos. 3,690,180A, 3,698,573A en 4,365,509A. According to the prior art, the level of a substance can also be measured using an elongated vertical resonance member of which the free length (i.e. the length participating in the resonance) depends on the level of the substance. Examples are provided in U.S. Pat. No. 3,133,442A, CN2222344Y, GB475274A and U.S. Pat. No. 5,054,318A. However, such solutions are not suitable for use in a loading space of a vessel.

U.S. Pat. No. 3, 133, 442 relates to a different technical field and requires the use of two elongated vibratory members.

The part of the vertical resonance member which is in the settled bed 5 will not participate in the resonance. However, the settled bed 5 may exert lateral forces to the resonance member, for instance caused by roll of the vessel or uneven loading of the loading/unloading of the loading space 1. Such lateral forces will increase the tensile force and therewith influence the resonance frequency. Furthermore, due to temperature changes and loading of the loading space, the loading space may deform, stretching the resonance member and therewith also influencing the resonance frequency $f_0$.

BRIEF DESCRIPTION

Therefore, it is an object to provide a method and a device which allows to determine the height of a settled bed in a mixture in a loading space accurately and efficiently.

According to an aspect there is provided a method for determining a height ($h_s$) of a settled bed in a mixture in a loading space, wherein the mixture consists of a settled bed and a mixture soup which is located above the settled bed, and wherein the method comprises:

a) providing an elongated resonance member in the loading space which extends in a substantial vertical direction,
b) measuring a resonance frequency ($f_o$) of the resonance member,
c) computing a height ($h_s$) of the settled bed based on the measured resonance frequency ($f_o$), wherein b) comprises determining an indication of or imposing the tensile force ($F_s$) acting in the longitudinal direction of the resonance member and c) comprises computing a height ($h_s$) of the settled bed based on the measured resonance frequency ($f_o$) and the determined indication of the tensile force or the imposed tensile force. The elongated resonance member extends in a vertical direction, i.e. from a lower end, which may be at the bottom of the loading space, to a position above the loading space.

By determining or imposing the tensile force in the resonance member, i.e. the force in the longitudinal direction of the resonance member, the effect of lateral forces acting on the part of the resonance member inside the settled bed, will at least partially be compensated, resulting in a more accurate computation of the height of the settled bed. Also deformation of the vessel and therewith stretching of the resonance member will be at least partially compensated in this way. When the tensile force is imposed, the tensile force is known despite lateral forces and other disturbances. When the tensile force is measured, it is measured repeatedly to take into account changes of the tensile force $F_s$ during the loading process.

For instance, if the settled bed exerts a lateral force to the resonance member, the resonance member will be pushed in a lateral direction, resulting in an increased tensile force and thus in an increased resonance frequency. The measurements and computations can be performed by a control unit, which may be formed by a computer device.

A typical length for a resonance member applied in a loading space of dredging vessel is 10-12 meters, the resonance member being strong enough to withstand tensile forces of about 8000 N. The set-up of the resonance member is typically such that the resonance frequency $f_0$ is below 150 Hz.

According to an embodiment c) comprises solving $h_s = L_{total} - 0.5 \, (F_s/\sigma)^{0.5}/f_o$. In this equation $L_{total}$ is the total length of the resonance member, $F_s$ the tensile force determined in b), $\sigma$ the mass of resonance member per meter and $f_o$ the resonance frequency measured in b). The method may further comprise determining any one of these further parameters or indications thereof. Determining may be done in any suitable way, including measurements and receiving, manual input.

This provides an easy way of determining the height of the settled bed.

According to an embodiment c) comprises computing the height ($h_s$) by computing a simulation of the elongated resonance member (10) or by comparing the measured resonance frequency ($f_o$) and the determined indication of the tensile force ($F_s$) or the imposed tensile force ($F_s$) with predetermined calibration data.

Comparing with predetermined calibration data may comprise performing computations, such as interpolation between available calibration data.

According to an embodiment the tensile force is imposed by mounting the resonance member at its upper end by means of a flexible connection.

It has been found that the height of the settled bed as computed may deviate from the actual height, due to forces acting on the resonance member, such as lateral forces, deformation of the loading space (due to temperature changed, loading forces), as such forces influence the tensile force in the resonance member and thus the resonance frequency.

By providing a flexible connection it is ensured that the tensile force in the resonance member is relatively constant, even when the resonance member is subject to lateral or deformation forces. According to this embodiment, the tensile force is imposed in a way that the tensile force remains constant as it was originally set, i.e. more constant than without a flexible connection, despite lateral force or the like.

Different flexible connections may be applied, examples of which are provided in this patent. The flexible connection may for instance be formed by a spring-based or spring element.

According to an embodiment action c) comprises modeling the flexible connection and compensating for the influence of the flexible connection on the resonance frequency.

It will be understood that the flexible connection itself also influences the resonance frequency. However, this influence can be compensated for by modeling the flexible connection. This may be done in different ways.

For instance, this influence can be compensated for by introducing a gain K and an offset O, which can be determined by calibrating the specific set-up of the resonance member. This results in the following formulae: $L_0 = O + K (0.5 \, (F_s/\sigma)^{0.5}/f_o)$, and thus $h_s = L_{total} - (O + K(0.5 \, (F_s/\sigma)^{0.5}/f_o))$. Instead of this linear calibration formula one can also use polynomial equations of any order.

According to an embodiment action c) comprises solving $h_s = L_{total} - (O + K(0.5 \, (F_s/\sigma)^{0.5}/f_o))$.

The values of the offset O and gain K depend on the specific set-up of the resonance member (dimensions, material etc.). Once these values are determined, the height of the settled bed can be determined by measuring $f_0$.

This embodiment has the disadvantage that a calibration needs to be performed for each specific set-up (e.g. flexible connection, length of the resonance member, mass per meter of the resonance member).

According to an embodiment action c) comprises solving $h_s = L_{total} - L_0$, wherein $$L_0 = \frac{1}{k}\left(\mathrm{atan}\left(\frac{-F_s k}{K_{veer} - m_1 \omega^2}\right) + n \cdot \pi\right),$$

wherein $$k = \sqrt{\frac{\sigma}{F_s}} \cdot \omega.$$

According to this embodiment, the flexible connection is modeled only once by the parameters $K_{veer}$ and $m_1$, thereby omitting the need to perform calibrations for each specific set-up. According to this embodiment, once $K_{veer}$ and $m_1$ are determined for a specific type of flexible connection, no further calibrations are required.

In this equations $L_{total}$ is the total length of the resonance member, $L_0$ the free length of the resonance member, $F_s$ the tensile force determined in b), $\sigma$ the mass of resonance member per meter, $f_o$ the resonance frequency measured in b), $\omega=2\pi f_0$, $K_{veer}$ the spring constant of the virtual spring representing the flexible connection, $m_1$ the virtual mass of the flexible connection, n is an integer, which is chosen n=1 if the resonance member resonates in its ground modus and may be chosen higher in case the resonance member is resonating in higher ($n^{th}$) order.

The method may further comprise determining any one of these further parameters or indications thereof. Determining may be done in any suitable way, including measurements and receiving, manual input.

The details of this computation are discussed in more detailed in the detailed description.

According to an embodiment action a) comprises imposing a tensile force (F) of the elongated resonance member using a tensile device connected to an end of the resonance member.

The tensile device may be provided to exert a predetermined pulling force to the resonance member. This way it is possible to control the tensile force in the resonance member in an accurate way, allowing accurate computation of the free length. The tensile device may be arranged to apply a predetermined, fixed tensile force (for instance using a pulley and a weight) or an adjustable tensile force (for instance using a hydraulic or pneumatic member). In both situations, the tensile force can be set to a predetermined value before measuring the resonance frequency.

According to an embodiment b) comprises measuring the tensile force using a tensile force meter.

This embodiment has the advantage that the tensile force is measured and is thus accurately known, allowing accurate computation of the height of the settled bed. It is noted that this embodiment can be used in combination with a flexible connection of the resonance member. Despite the flexible connection, the tensile force may still vary a little. That's because the flexible connection doesn't compensates the lateral and other deformation forces perfectly. Such variations can be taken into account by measuring them, resulting in an even more accurate computation of the height of the settled bed. According to an aspect there is provided a device for determining a height ($h_s$) of a settled bed in a mixture in a loading space of a vessel, wherein the mixture consists of a settled bed and a mixture soup which is located above the settled bed, the device comprising an elongated resonance member in the loading space which extends in a substantial vertical direction, the device comprising a resonance frequency meter for determining a resonance frequency ($f_o$) of the resonance member characterized in that the device comprises means for determining an indication of the tensile force ($F_s$) or imposing the tensile force ($F_s$) acting in the longitudinal direction of the resonance member.

According to an embodiment there is provided a device that comprises a control unit arranged to compute the height ($h_s$) of the settled bed based on the measured resonance frequency ($f_o$) and the determined indication of the tensile force ($F_s$) or the imposed tensile force ($F_s$).

Computing the height may be done by solving a suitable formula, by performing a simulation of the elongated resonance member or by comparing the measured resonance frequency and the determined indication of the tensile force or the imposed tensile force with predetermined calibration data. Comparing with predetermined calibration data may comprise performing computations, such as interpolation between available calibration data.

The control unit may be formed by a computer or a control unit. The control unit may be arranged to perform any one of the computations described, such as the computations provided above.

According to an embodiment the resonance member is at its upper end mounted by means of a flexible connection.

According to an embodiment the resonance member is at its upper end mounted by means of a spring element, for instance a mechanical, a pneumatic or a hydraulic spring element.

Using a spring element ensures that the tensile force remains substantially constant.

According to an embodiment the resonance member is at its upper end mounted by means of a pneumatic or hydraulic cylinder.

A pneumatic or hydraulic cylinder can be controlled to impose a predetermined tensile force. By measuring the pneumatic or hydraulic pressure an indication of the tensile force is obtained. However the real tensile force may differ from the value calculated from the pneumatic or hydraulic pressure, e.g. caused by friction in the cylinder. Therefore a real measurement of the tensile force is still preferred for highest accuracy.

According to an embodiment the device comprises a weight connected to the upper end of the resonance member to impose a tensile force ($F_s$).

According to an embodiment the upper end of the resonance member is connected to the weight via a lever or by a rope and a top wheel.

According to an embodiment the resonance member is at its upper end mounted to a fixed point. The term fixed point is used here to refer to a point which is fixed relative to the loading space.

According to an embodiment the resonance member comprises a tensile force meter provided at its upper end.

According to an aspect there is provided a vessel comprising a loading space and a device for determining a height ($h_s$) of a settled bed in a mixture in the loading space of the vessel as described above.

According to an aspect there is provided a control unit comprising a processor, wherein the control unit is designed to carry out the method as described above.

According to an aspect there is provided a computer program which, when loaded on such a control unit, enables the processor of the control unit to carry out any one of the methods as described above.

According to an aspect there is provided a data medium, comprising such a computer program.

BRIEF DESCRIPTION OF THE DRAWINGS

Embodiments of the invention will be described below, purely by way of example, with reference to the accompanying schematic drawings, wherein corresponding components are indicated by corresponding reference symbols, and wherein.

Figure 1:
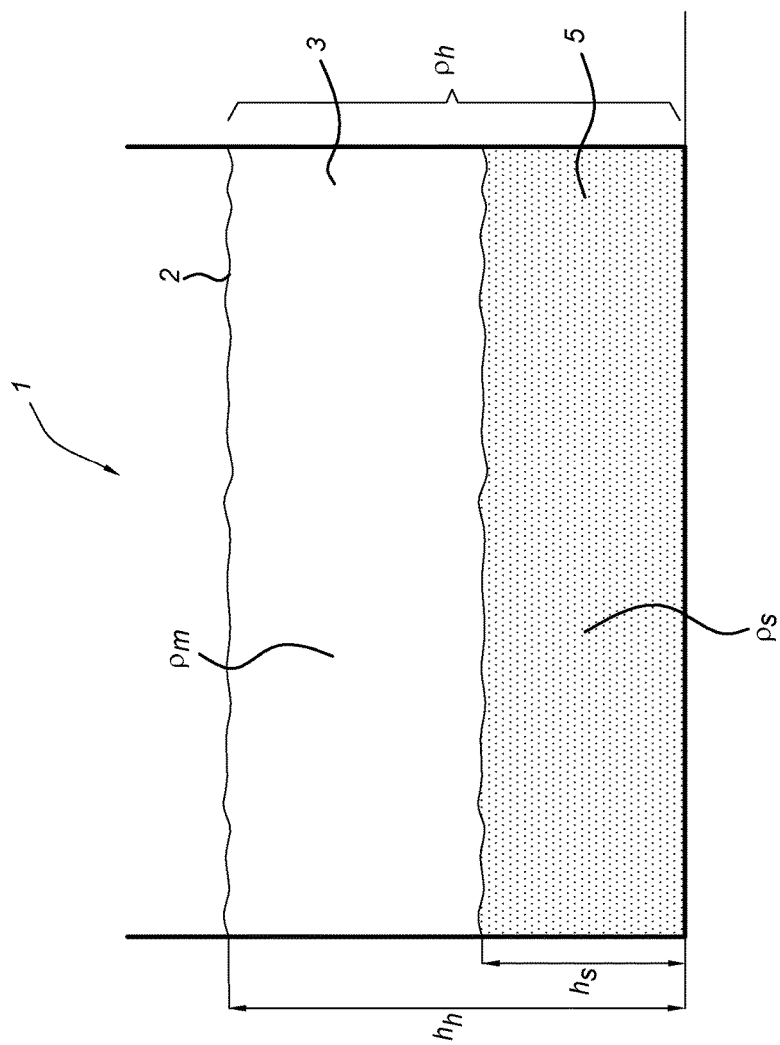
FIG. 1 shows schematically a cross section of a loading space according to the prior art, FIG. 2-6 schematically show different embodiments, and FIG. 7 schematically depicts a method according to an embodiment.

The drawings are intended for illustrative purposes only, and do not serve to restrict the scope of protection, which is defined by the claims.

DETAILED DESCRIPTION

In the embodiments discussed here, a method and device are discussed which are suitable for determining the height $h_s$ of the settled bed 5 in a loading space 1 of a vessel, even during the loading process.

According to the embodiments a vertical, elongated resonance member 10 is mounted in the loading space 1. The resonance member 10 may also be referred to as a wire or a string. The resonance member 10 may be a wire or a string, for instance a steel cable, a massive steel wire, a synthetic or plastic wire or a wire or string made from one or more other materials. The resonance member 10 is vertically mounted in the loading space 1. The lower end 11 of the resonance member 10 may be attached to the bottom of the loading space 1, while the upper end 12 of the resonance member 10 may be attached to a suspension point above the highest filling level of the loading space 1.

The elongated resonance member 10 has a resonance frequency $f_o$:

$$f_o = 0.5(P/\rho)^{0.5}/L_f [Hz] \quad (1.1)$$

or $$f_o = 0.5(F/\sigma)^{0.5}/L_f [Hz] \quad (1.2)$$

with $L_f$=free length of the resonance member [m]
  P=tensile stress in the resonance member [Pa=N/m$^2$]
  $\rho$=density of the material of the resonance member [kg/m$^3$].
$F_s$=tensile force in resonance member [N]
$\sigma$=mass of resonance member per meter [kg/m].

The term free length $L_f$ is used to indicate the portion of the resonance member that can participate in the resonance, i.e. the part that is not in the settled bed 5. The skilled person will know how to measure the resonance frequency $f_o$ of such a resonance member 10. Examples are provided in U.S. Pat. No. 7,574,898 and WO2011007972. In order to measure the resonance frequency $f_0$ the resonance member 10 may be brought into vibration. This may be done in any suitable way, for instance using electro-mechanical means or mechanical means, such as a rotating wheel, a hammer, a piston or the like.

With a rising settled bed 5, the free length $L_f$ of the resonance member 10 will decrease as the part of the resonance member 10 embedded in the settled bed 5 will no longer be able to resonate. The free length $L_f$ is directly linked to the height $h_s$ of the settled bed 5. During loading, the free length $L_f$ will decrease, causing the resonance frequency $f_o$ to increase. It has been found that the presence or height of the mixture soup 3 has little effect on the resonance frequency $f_o$.

As mentioned above, lateral forces of the sand bed may act on the part of the resonance member 10 clamped by this settled bed 5, for instance caused by roll of the vessel or uneven loading of the loading space 1.

A typical total length $L_{total}$ of the resonance member 10 is 12 meters. The resonance member 10 may be formed by a string or wire having a thickness of 1 cm, to ensure that the resonance member 10 is strong enough to withstand the lateral forces. The breaking force of the resonance member 10 is preferably 60000N or more.

Typically, the tensile stress P in a massive steel resonance member is about $10^8$ Pa. This requires a tensile force of 8000N in combination with a resonance member 10 having a thickness of 1 cm. The above results in a resonance frequency $f_o$ of about 3 Hz for a height $h_s$=0 and in a resonance frequency $f_o$ of about 30 Hz for a height $h_s$=9 m. If the density of the material of the resonance member 10 and the shape and dimensions of the resonance member are known, the values of $\sigma$ and $\rho$ can be computed. For instance for a steel resonance member, it is known that the density $\rho$ of steel is about 7800 kg/m$^3$, and from that the mass $\sigma$ per meter can be calculated ($\sigma=\rho$/cross section of resonance member).

A smaller tensile force will result in lower resonance frequencies, which are more difficult to measure.

In order to take into account the lateral and other deformation forces, the tensile force $F_s$ may be determined or imposed in order to compute the free length $L_f$ more accurately. The free length $L_f$ of the resonance member 10 can be computed using:

$$L_f = 0.5(F_s/\sigma)^{0.5}/f_o [m] \quad (2)$$

The height $h_s$ of the sand bed 5 can be computed using:

$$h_s = L_{total} - L_f [m] \quad (3)$$

A number of embodiments will be provided in which the tensile force $F_s$ is determined or imposed.

Figure 2:
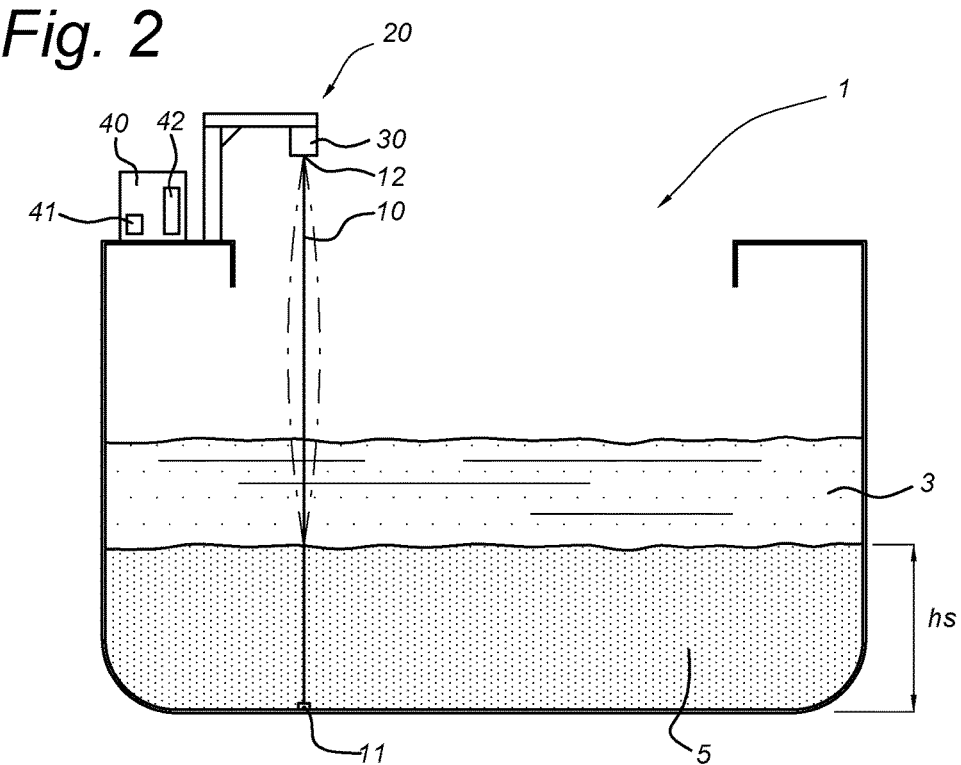

FIG. 2 schematically depicts a cross-sectional view of a loading space 1 in which a device 20 is provided for determining the height $h_s$ of a settled bed in a mixture in a loading space 1 of a vessel, wherein the mixture consists of a settled bed 5 and a mixture soup 3 which is located above the settled bed 5. The device 20 comprises an elongated resonance member 10 in the loading space 1 which extends in a substantial vertical direction. The device 20 further comprises means for measuring the resonance frequency $f_o$ of the resonance member 10, which are not shown in the drawings. These means may comprise a resonance frequency meter and means for inducing a vibration in the elongated resonance member 10. Inducing a vibration may for instance be done by hitting the resonance member 10 with a hammer, a rotating disc a piston or a clapper. The vibration may also be induced using electromagnetic means.

The resonance frequency $f_0$ may be determined in any suitable manner, for instance by measuring the time interval T between moments on which the resonance member 10 passes its rest position and applying: $f_o=1/(2T)$ or via a frequency analysis (FFT) of the measurement signal.

The embodiment shown in FIG. 2 comprises means for determining an indication of the tensile force $F_s$ acting in the longitudinal direction of the resonance member provided by a tensile force meter 30 which is provided at or near the upper end of the resonance member 10. In the embodiment shown in FIG. 2, the upper end 12 of the resonance member 10 is attached to tensile force meter 30 which itself is attached to a fixed point, i.e. a point fixed with respect to the loading space 1. Suitable tensile force measurements are often based on strain gauges.

FIG. 2 further shows a control unit 40. The control unit 40 may be formed as a computer and may comprise a processor 41. The processor 41 may be arranged to perform the methods as described. The control unit 40 may comprise a memory 42 comprising programming lines or instructions lines which are readable and executable by the processor 41 to provide the processor 41 to carry out any one of the methods described. The control unit 40 may be arranged to receive measurements from the tensile force meter 30. The control unit 40 may further be arranged to receive further information and parameters and control remote devices which are required for performing the methods. The control unit 40 may for instance be arranged to control the means for measuring the resonance frequency $f_o$ of the resonance member 10 to initiate a measurement by bringing the resonance member in resonance and measure the resonance frequency and communicate it to the control unit 40.

FIGS. 3-6 show embodiments wherein the resonance member is at its upper end 12 mounted by means of a flexible connection.

Figure 3:
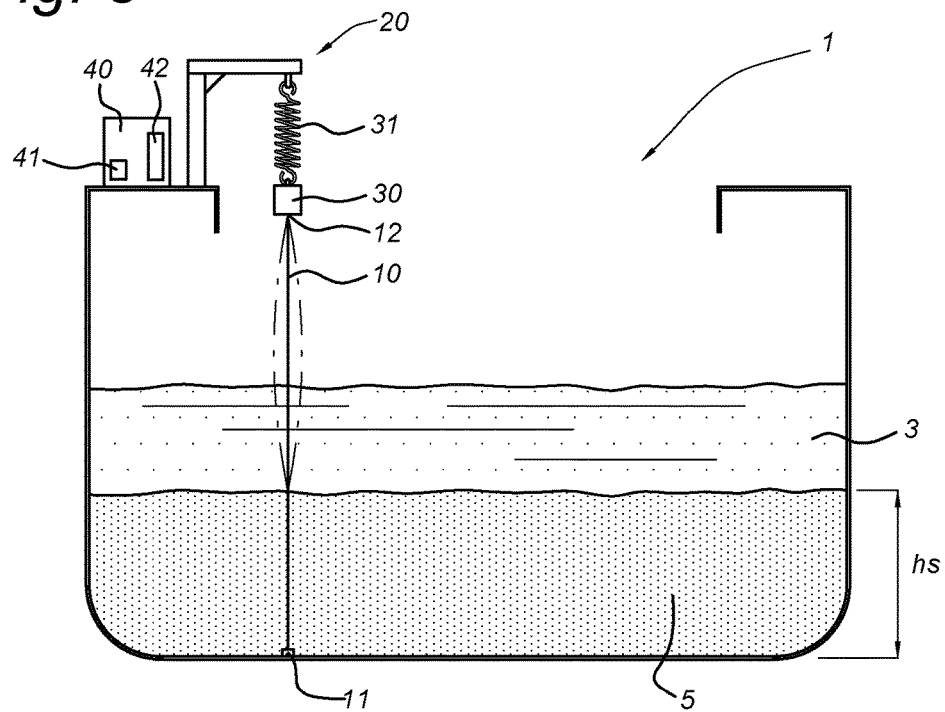

FIG. 3 shows a spring element 31, depicted as a coil spring, which connects the upper end 12 of the resonance member 10 to a fixed point. The upper end 12 is now flexible and can move with respect to the loading space 1. Other types of spring elements 31 may be used instead, such as any type of mechanical, pneumatic or hydraulic spring element 31.

FIG. 4 schematically depicts a pneumatic or hydraulic cylinder 32 instead of a coil spring. The pneumatic or hydraulic cylinder 32 also forms a flexible connection as it provides the upper end 12 of the resonance member 10 with freedom of movement in the direction of movement of the piston. The upper end 12 may move up and down as the hydraulic cylinder may function as a spring element 31. Also, the hydraulic cylinder 32 may be mounted by a rotatable hinge 33 providing the hydraulic cylinder with the freedom to perform a swinging motion.

Both embodiments described under reference to FIGS. 3 and 4 comprise a tensile force meter 30. However, as the flexible connection is in itself an improvement, the addition of a tensile force meter 30 may still be preferred to acquire more accurate information about the tensile force. In case a spring element 31 is used, the tensile force may change a little when the spring is stretched. In case of a pneumatic or hydraulic cylinder 32 the tensile force may change because of friction in the cylinder. So, in these cases addition of a tensile force meter is preferred.

The device may also comprise means for imposing the tensile force $F_s$ acting in the longitudinal direction of the resonance member 10. Examples of such embodiments are provided in FIGS. 4-6. It is noted that the embodiment shown in FIG. 4 may be used just to provide a flexible connection for the upper end 12 but may also be used to impose a predetermined tensile force $F_s$. The control unit 40 may control the pneumatic or hydraulic cylinder 32.

Figure 6:
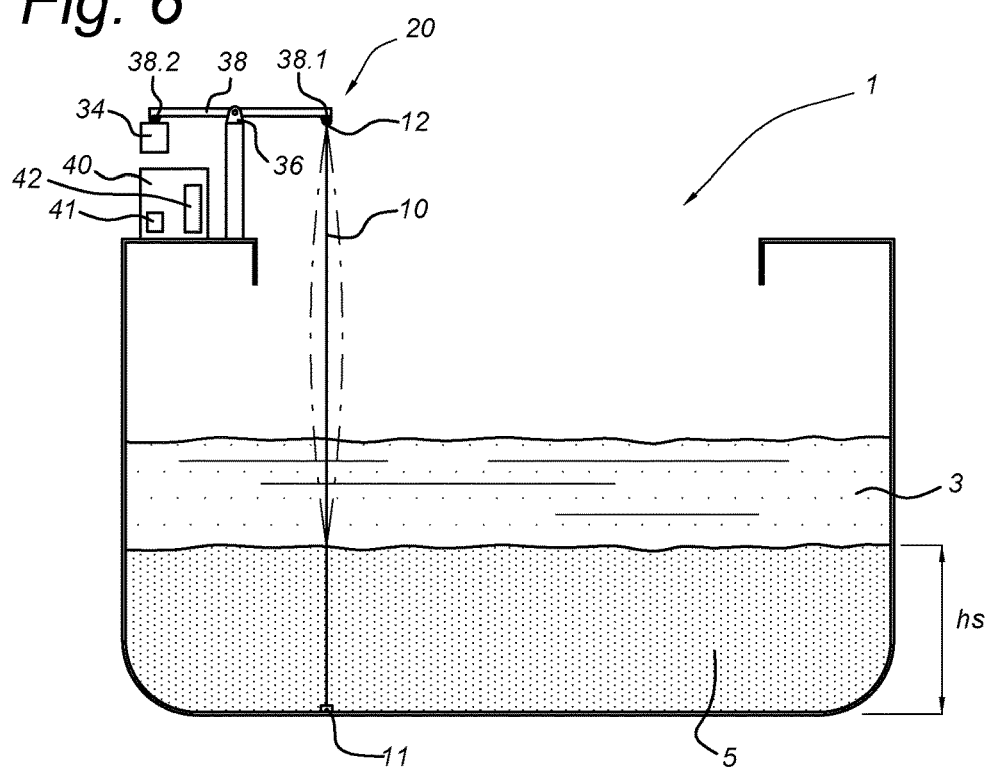

Other embodiments in which a tensile force $F_s$ is imposed are shown in FIGS. 5 and 6. In these embodiments a weight 34 is provided to exert a predetermined tensile force $F_s$. The weight 34 may be exerting a tensile force $F_s$ to the upper end 12 of the resonance member 10 to generate a tensile force $F_s$.

As shown in the embodiment depicted in FIG. 5, the weight is connected to the upper end 12 of the resonance member 10 via a rope 37, whereby the rope 37 runs via a top wheel 35 which is mounted above the upper end 12. The rotational axis of the top wheel 35 is substantially horizontal.

FIG. 6 schematically depicts an embodiment wherein the upper end 12 of the resonance member 10 is connected to a first end 38.1 of a lever 38 and the weight is connected to or positioned upon a second end 38.2 of the lever 38. In between the first and second end a pivoting point 36 is provided. The embodiments described with reference to FIGS. 4-6 allow to impose a predetermined tensile force $F_s$. However also for these embodiments the tensile force meter (30) is preferred, because the predetermined tensile force may not exactly be transferred to the resonance member because of friction in the tensioning device (e.g. in the cylinder or in the top wheel).

The control unit 40 is arranged to compute the height $h_s$ of the settled bed 5 based on the measured resonance frequency $f_o$ and the determined indication of the tensile force $F_s$ or the imposed tensile force $F_s$. The control unit 40 may be arranged to receive the information and parameters which are necessary. The control unit 40 may initiate measurements (such as measuring the resonance frequency, the tensile force), may ask a user or a remote computer for input (e.g. regarding the material properties of the resonance frequency) to compute the height $h_s$.

The height $h_s$ may be determined repeatedly during loading, for instance once every second. In order to cancel or reduce noise, the height $h_s$ may be determined on the basis of a running average.

Figure 7:
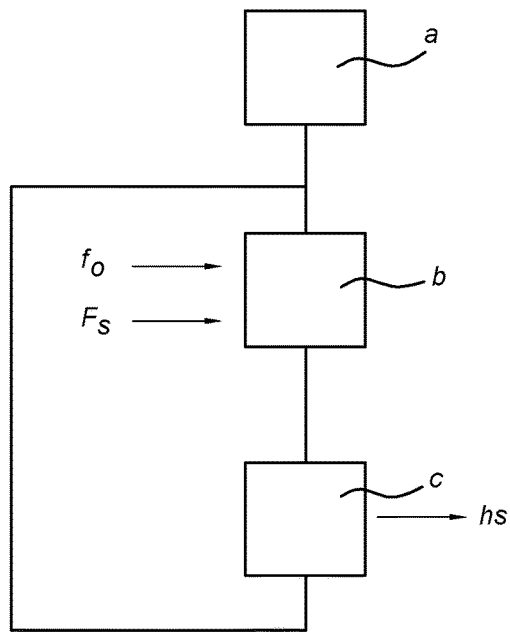

FIG. 7 schematically depicts a method according to an embodiment. Action a) involves a) providing an elongated resonance member 10 in the loading space 1 which extends in a substantial vertical direction. This action is typically done once. Action a) may also involve providing more than one elongated resonance member 10 at different locations in the loading space 1 to increase the accuracy of the determined height $h_s$.

The following actions b) and c) may be performed under control of the control unit 40:

b) measuring a resonance frequency $f_o$ of the resonance member 10 and determining an indication of or imposing the tensile force $F_s$ acting in the longitudinal direction of the resonance member 10, and c) computing a height ($h_s$) of the settled bed (5) based on the measured resonance frequency ($f_o$) and the determined indication of the tensile force or the imposed tensile force.

The formulae which may be used in action c) were already described above.

The tensile force $F_s$ may thus be imposed, for instance according to the embodiments described above with reference to FIGS. 4-7 or the tensile force $F_s$ may be measured, for instance according to the embodiments described above with reference to FIGS. 2-4.

The tensile force meter 30 is preferably attached close to the upper end 12. For the embodiment shown in FIG. 5 it is noted that the tensile force meter 30 is preferably positioned in between the resonance member 10 and the wheel 35 (although not shown in FIG. 5).

According to an embodiment, action c) may comprise solving $$L_0 = \frac{1}{k}\left(\mathrm{atan}\left(\frac{-F_s k}{K_{veer} - m_1 \omega^2}\right) + n \cdot \pi\right),$$

wherein $$k = \sqrt{\frac{\sigma}{F_s}} \cdot \omega. \tag{4}$$

According to this embodiment, the flexible connection is modeled by the parameters $K_{veer}$ and $m_1$, thereby omitting the need to perform calibrations for each specific set-up. The above formula can be derived as follows. The resonance frequency is influenced when the resonance member is flexibly mounted at the top. This flexible connection corrects the influence of lateral forces of the sand bed and deformation of the loading space. However the flexible mounting itself will oscillate in horizontal direction, caused by the horizontal component of the tensile force which will be present when the resonance member is pushed in a lateral direction and will slightly deform in a sideway direction.

The horizontal flexibility of the flexible mounting point can be modeled by a mass $m_1$ and the horizontal spring with spring characteristic $K_{veer}$ [N/m]. In the flexible mounting point the sidewise movement u can be described by the following equation of movement:

$$m_1 \frac{d^2 u(t)}{dt^2} = -K_{veer} u(t) - F_s \frac{\partial x(L_0 \cdot t)}{\partial z} \quad (5)$$

It is also known that the equation of movement of an oscillating wire or string (resonance member) is $$\sigma \frac{\partial^2 x(z,t)}{\partial t^2} = F_s \frac{\partial^2 x(z,t)}{\partial z^2} \quad (6)$$

with z the vertical axis from the point where the sand bed clamps the resonance member 10 up to the top. At the top z is equal to the free length of the wire: $z=L_0$ and at the bottom (that is the top of the sand bed) z=0.

Further applies: $x(0,t)=0$ and $x(L_0,t)=u(t)$ \quad (7)

Combining formulae (5), (6) and (7) results in the following formula, wherein the free length $L_0$ of the resonance member can be calculated from the tensile force $F_s$ and resonance frequency $f_0$:

$$L_0 = \frac{1}{k}\left(\operatorname{atan}\left(\frac{-F_s k}{K_{veer} - m_1 \omega^2}\right) + n \cdot \pi\right)$$

with $$k = \sqrt{\frac{\sigma}{F_s}} \cdot \omega$$

and $\omega = 2\pi f_o$

In principle the resonance member 10 can oscillate in its base resonance frequency $f_0$ (n=1) and in multiples (n) of it.

According to a further embodiment there is provided a device for determining a height ($h_s$) of a settled bed in a mixture in a loading space (1) of a vessel, wherein the mixture consists of a settled bed (5) and a mixture soup (3) which is located above the settled bed (5), the device comprising an elongated resonance member (10) in the loading space (1) which extends in a substantial vertical direction, the device comprising a resonance frequency meter for determining a resonance frequency ($f_o$) of the resonance member (10), wherein the resonance member (10) is at its upper end mounted by means of a flexible connection. The flexible connection may be any one of the flexible connections described above and shown in FIGS. 3-6.

It will be clear that the embodiments described above are described only by way of example and not in any limiting sense, and that different modifications and adaptations are possible without exceeding the scope of the invention, and that the scope is determined only by the attached claims.

The invention claimed is:

1. A method for determining a height of a settled bed in a mixture in a loading space during a dredging operation, wherein the mixture consists of a settled bed and a mixture soup in liquid form which is located above the settled bed, and wherein the method comprises:
    a) providing an elongated resonance member in the loading space which extends from a fixed point with respect to the loading space above the mixture soup in a substantially vertical direction into the mixture soup and the settled bed and connects to a bottom of the loading space at a lower end;
    b) measuring a resonance frequency of the resonance member;
    c) computationally measuring a height of the settled bed below the mixture soup based on the measured resonance frequency;
        wherein b) comprises determining an indication of or imposing a tensile force acting in the longitudinal direction of the resonance member and c) comprises providing a controller with a processor configured for computing a height of the settled bed based on the measured resonance frequency and the determined indication of the tensile force or the imposed tensile force.

2. The method according to claim 1, wherein c) comprises solving $h_s = L_{total} - 0.5(F_s/\sigma)^{0.5}/f_o$, wherein $h_s$ is the height of the settled bed, $L_{total}$ is the total length of the resonance member $F_s$ the tensile force, $\sigma$ the mass of resonance member per meter and $f_o$ the resonance frequency.

3. The method according to claim 1, wherein c) comprises computing the height by computing a simulation of the elongated resonance member or by comparing the measured resonance frequency and the determined indication of the tensile force or the imposed tensile force with predetermined calibration data.

4. The method according to claim 1, wherein the tensile force is imposed by mounting the resonance member at its upper end by means of a flexible connection which is then connected to the fixed point above the mixture soup.

5. The method according to claim 4, wherein action c) comprises modeling the flexible connection and compensating for the influence of the flexible connection on the resonance frequency.

6. The method according to claim 1, wherein action a) comprises imposing a tensile force of the elongated resonance member using a tensile device connected to an end of the resonance member.

7. The method according to claim 1, wherein b) comprises measuring the tensile force using a tensile force meter.

8. A control unit comprising a processor, wherein the control unit is designed to carry out the computational step c of the method according to claim 1.

9. A system for determining a height of a settled bed in a mixture in a loading space of a vessel during a dredging operation, wherein the mixture consists of a settled bed and a mixture soup of liquid which is located above the settled bed, the device comprising:
    an elongated resonance member in the loading space which extends in a substantially vertical direction connecting from a fixed point above the mixture soup into the mixture soup and the settled bed and connects to a bottom of the loading space at a lower end,
    a resonance frequency meter for determining a resonance frequency of the resonance member;

means for determining an indication of the tensile force or imposing the tensile force acting in the longitudinal direction of the resonance member; and a control unit arranged to compute the height of the settled bed based on the measured resonance frequency and the determined indication of the tensile force or the imposed tensile force.

10. The device according to claim 9, wherein the resonance member is at its upper end mounted by means of a flexible connection to correct the influence of lateral forces and deformation of the loading space.

11. The device according to claim 9, wherein the resonance member is at its upper end mounted by means of a spring element to correct the influence of lateral forces and deformation of the loading space.

12. The device according to claim 9, wherein the resonance member is at its upper end mounted by means of a pneumatic or hydraulic cylinder.

13. The device according to claim 9, wherein the device comprises a weight connected to the upper end of the resonance member to impose a tensile force.

14. The device according to claim 13, wherein the upper end of the resonance member is connected to the weight via a lever or by a rope and a top wheel.

15. The device according to claim 9, wherein the means for determining an indication of the tensile force comprises a tensile force meter provided at an upper end of the resonance member.

16. A vessel comprising a loading space and a device for determining a height of a settled bed in a mixture in the loading space of the vessel according to claim 9.

17. A non-transitory computer readable medium which, when loaded on a control unit according to claim 9, enables the processor of the control unit to computationally measure a height of the settled bed based on the measured resonance frequency.

* * * * *